(12) United States Patent
Turner et al.

(10) Patent No.: US 10,018,223 B2
(45) Date of Patent: Jul. 10, 2018

(54) AXIAL FLUX ELECTRICAL MACHINE BEARING MOUNT SYSTEM AND METHODS

(71) Applicants: Regal Beloit Australia, PTY., Ltd., Rowville, Victoria (AU); Changzhou Regal-Beloit Sinya Motor Co., LTD, Changzhou, Jiangsu (CN)

(72) Inventors: Matthew J. Turner, Rowville (AU); Greg Heins, Rowville (AU); Bin Chen, Jiangsu (CN); Dingcheng Wang, Jiangsu (CN); Byron J. Kennedy, Rowville (AU); Hani Chahine, Rowville (AU)

(73) Assignee: Regal Beloit Australia, PTY., LTD., Rowville, Victoria (AU)

( * ) Notice: Subject to any disclaimer, the term of this patent is extended or adjusted under 35 U.S.C. 154(b) by 292 days.

(21) Appl. No.: 14/863,731

(22) Filed: Sep. 24, 2015

(65) Prior Publication Data
US 2016/0087505 A1    Mar. 24, 2016

(30) Foreign Application Priority Data

Sep. 24, 2014  (CN) .......................... 2014 1 0649086

(51) Int. Cl.
| H02K 5/16 | (2006.01) |
|---|---|
| F16C 27/06 | (2006.01) |
| H02K 1/27 | (2006.01) |
| H02K 1/30 | (2006.01) |
| H02K 5/173 | (2006.01) |

(52) U.S. Cl.
CPC ......... *F16C 27/063* (2013.01); *H02K 1/2793* (2013.01); *H02K 1/30* (2013.01); *H02K 5/163* (2013.01); *H02K 5/1735* (2013.01); *H02K 2205/03* (2013.01); *H02K 2213/03* (2013.01)

(58) Field of Classification Search
CPC ...... F16C 27/063; H02K 1/2793; H02K 1/30; H02K 5/163; H02K 5/1735
USPC .......................................................... 310/90
See application file for complete search history.

(56) References Cited

U.S. PATENT DOCUMENTS

| 1,810,204 A | 6/1931 | Dickson |
| 3,348,289 A | 10/1967 | Marsh |
| 5,917,258 A | 6/1999 | Kershaw et al. |
| 2002/0158533 A1 | 10/2002 | Wright |

(Continued)

FOREIGN PATENT DOCUMENTS

| CN | 202145615 U | 2/2012 |
| EP | 0886365 A1 | 12/1998 |

(Continued)

OTHER PUBLICATIONS http://www.rubbercal.com/sheet-rubber/neoprene-durometer/.*
Extended European Search Report for Application No. 15186700.9, dated Jun. 30, 2016, 8 pages.

*Primary Examiner* — Terrance Kenerly
(74) *Attorney, Agent, or Firm* — Armstrong Teasdale LLP

(57) ABSTRACT

An axial flux electrical machine includes a housing having a center portion with a cylindrical wall, a stator assembly attached to the housing, a bearing assembly attached to the stator assembly, and a rotor assembly rotatably attached to the bearing assembly. A bearing mount system includes a bearing isolator that is attached to the wall of the housing, and a bearing cup that is attached to the bearing assembly and the bearing isolator.

17 Claims, 15 Drawing Sheets

(56) References Cited

U.S. PATENT DOCUMENTS

2003/0189388 A1* 10/2003 Hashimoto ............ H02K 7/116
                                                                          310/268
2008/0218009 A1    9/2008  Fukuno et al.
2014/0265653 A1    9/2014  Heins et al.

FOREIGN PATENT DOCUMENTS

| EP | 1258967 A2 | 11/2002 |
|---|---|---|
| EP | 1228561 B1 | 7/2004 |
| JP | H08280153 A | 10/1996 |

\* cited by examiner

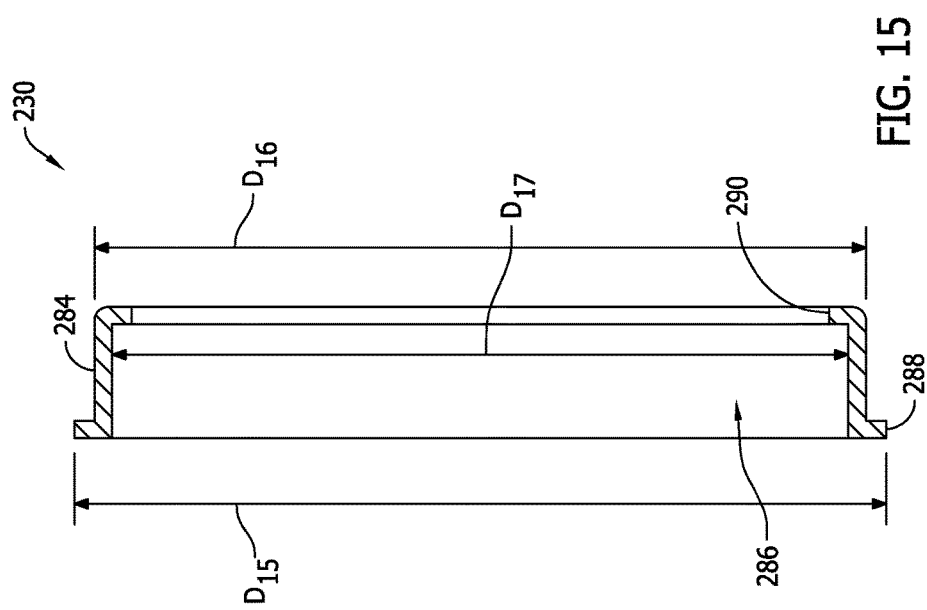

AXIAL FLUX ELECTRICAL MACHINE BEARING MOUNT SYSTEM AND METHODS

CROSS REFERENCE TO RELATED APPLICATION

This application claims priority to Chinese Application No. 201410649086.0 filed Sep. 24, 2014, which is hereby incorporated by reference in its entirety.

BACKGROUND

The embodiments described herein relate generally to electrical machines, and more particularly, to systems and methods for assembling an axial flux electrical machine having a damped resilient bearing mount system.

Some known axial flux electric motors are commonly used in air moving systems that are very sensitive to noise. These motors generally provide for a smaller package than traditional radial flux motors that enables their use in tight package installations. For example, split room air conditioning (RAC) systems have an in-room unit that needs to be small and quiet. Often, split-RAC systems have noise specifications directed to the audible noise emitted from the motor. In many split-RAC systems the in-room unit is positioned at an end users head level. This placement facilitates the efficient transmission of noise from the in-room unit to the end user.

Due to various factors such as fluctuating electromagnetic forces used to excite the motor assembly, operation of the motor may cause excessive surface vibration of the motor components. This vibration results in the generation of undesired noise and structural sound transmission, which often propagates to the room interior, thereby having a deleterious effect on user comfort.

At least some known motors are manufactured to reduce acoustic noise radiation. One known approach is to use resilient washers positioned proximate the bearings of the motor to resist movement of the armature of the motor relative to the frame, thus, attempting to minimize noise created by axial movement of the armature. Other noise suppression approaches include the use of noise absorption materials, barriers, and circuits. None of these efforts, however, discloses a complete solution for effective suppression of vibration and noise generated in an axial flus electric motor.

BRIEF DESCRIPTION

In one aspect, an axial flux electrical machine is provided. The axial flux electrical machine includes a housing having a center portion. The center portion of the housing has a cylindrical wall. The axial flux electrical machine also includes a stator assembly attached to the housing. Furthermore, the axial flux electrical machine includes at least one bearing assembly attached to the stator assembly. The axial flux electrical machine also includes a rotor assembly rotatably attached to the at least one bearing assembly. Moreover, the axial flux electrical machine includes a bearing mount system. The bearing mount system includes a bearing isolator attached to the wall of the housing, and a bearing cup attached to the at least one bearing assembly and the bearing isolator.

In another aspect, a bearing mount system for an axial flux electrical machine is provided. The axial flux electrical machine includes a housing including a wall having an inner surface, and a rotor assembly rotatably attached to the housing using a bearing assembly. The bearing mount system includes a bearing isolator coupled to the inner surface of the wall of the housing. The bearing isolator includes an inner surface having an inner diameter. The bearing mount system also includes a bearing cup including a radially-inward-extending flange located at a first end of the bearing cup. The bearing cup is coupled to an outer ring of the bearing assembly. The bearing cup is further coupled to the inner surface of the bearing isolator.

In yet another aspect, a method of assembling an axial flux electrical machine is provided. The method includes providing a rotor assembly and a housing including a cylindrical wall. The method includes coupling at least one bearing assembly to the rotor assembly such that an inner ring of the at least one bearing assembly forms an interference fit with the rotor assembly. The method further includes coupling a bearing cup to the at least one bearing assembly such that an outer ring of the at least one bearing assembly forms an interference fit with the bearing cup. Furthermore, the method includes coupling a bearing isolator to the bearing cup. Moreover, the method includes coupling the rotor assembly to the housing, wherein the bearing isolator engages the wall of the housing.

BRIEF DESCRIPTION OF THE DRAWINGS

FIG. 15 is a sectional view of the alternative bearing cup taken about line 15-15 of FIG. 14.

Although specific features of various embodiments may be shown in some drawings and not in others, this is for convenience only. Any feature of any drawing may be referenced and/or claimed in combination with any feature of any other drawing.

DETAILED DESCRIPTION

Figure 1:
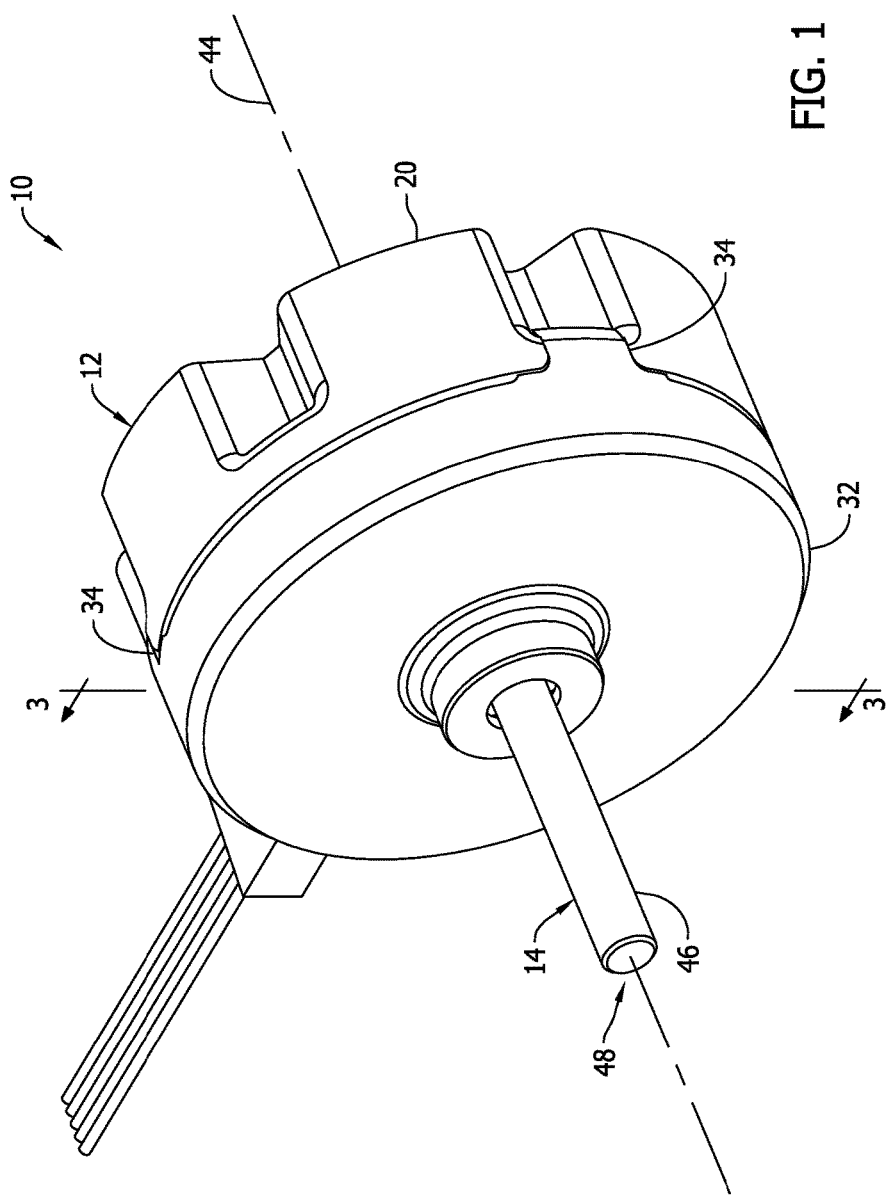
FIG. 1 is a schematic perspective of an exemplary electrical machine.
Figure 2:
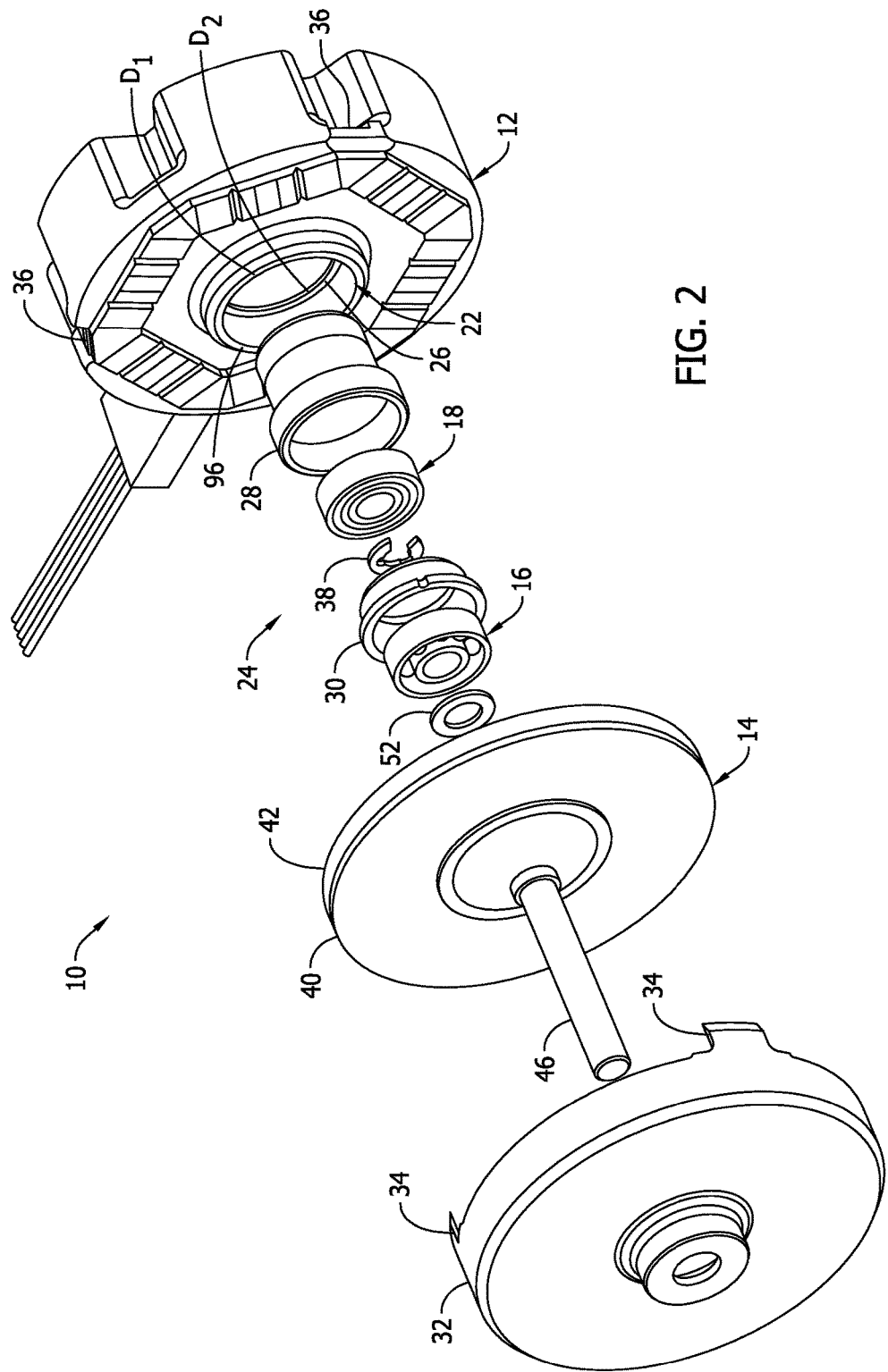
FIG. 2 is an exploded view of the electrical machine.

FIG. 1 is a schematic perspective of an exemplary electrical machine 10. FIG. 2 is an exploded view of electrical machine 10. In the exemplary embodiment, electrical machine 10 is an electric motor, and more specifically, an axial flux electric motor. It is understood, however, that electrical machine 10 may function as either an electric motor or an electric generator. In the exemplary embodiment, electrical machine 10 includes a housing 12, a stator assembly (not shown) coupled within housing 12, a rotor assembly 14 coupled to housing 12 via a primary bearing assembly 16 and a secondary bearing assembly 18, and a controller assembly (not shown) coupled within housing 12.

In the exemplary embodiment, housing 12 is configured to provide a protective covering for electrical machine 10 and the controller assembly. Housing 12 includes a casing 20 configured to completely enclose the stator assembly and the controller assembly. In the exemplary embodiment, casing 20 is suitably fabricated from any number of materials, including a non-conductive plastic or other flexible or compliant material. For example, without limitation, casing 20 is formed by an injection molding, forming, or extruding process used for fabricating parts from a thermoplastic or thermosetting plastic material and/or metal. Alternatively, casing 20 is fabricated from a combination of materials, for example, buy attaching a flexible or compliant material to a rigid material. In some alternative embodiments, casing 20 is fabricated from any suitable material, such as metal, that enables casing 20 to function as described herein. In the exemplary embodiment, casing 20 is fabricated from an insulative resin using an injection molding process, where the stator assembly and the controller assembly are completely encapsulated in the insulative resin material.

In the exemplary embodiment, casing 20 includes a center portion 22 that is configured to receive a bearing mount system 24. Center portion 22 is formed as a substantially cylindrical stepped bore in casing 20 and includes a first bore diameter D1 and a step or lip 26 that defines a smaller second bore diameter D2 of center portion 22. In the exemplary embodiment, center portion 22 receives a bearing isolator 28 that is seated in center portion 22. Bearing isolator 28 receives secondary bearing assembly 18 and a bearing cup 30, which receives primary bearing assembly 16 therein. Bearing isolator 28 engages and locates secondary bearing assembly 18 and bearing cup 30 engages and locates primary bearing assembly 16 by engaging an outer race portion of the respective bearing assemblies to position and secure bearing assemblies 16, 18 such that bearing assemblies 16, 18 are positioned radially inward from and concentric with the stator assembly.

In the exemplary embodiment, housing 12 also includes a cover 32 that is configured to couple to casing 20, thereby enclosing additional components of electrical machine 10 within housing 12. Housing 12 is configured to maintain an axially stationary position of the stator assembly, bearing assemblies 16, 18, and the controller assembly during rotation rotor assembly 14. Cover 32 is shaped to conform to the perimeter shape of casing 20. Cover 32 is coupled to cover 20 using a plurality of resilient snap latches 34, which are received in respective receiving grooves 36 formed on casing 20. In the exemplary embodiment, cover 32 is suitably fabricated from any number of materials, including a plastic or resilient material. For example, without limitation, cover 32 is formed by an injection molding, forming, or extruding process used for fabricating parts from a thermoplastic or thermosetting plastic material and/or metal. Alternatively, cover 32 is fabricated from a combination of materials, for example, by attaching a flexible or resilient material to a rigid material. In alternative embodiments, cover 32 is fabricated from any suitable material, such as metal, that enables cover 32 to function as described herein.

In the exemplary embodiment, rotor assembly 14 includes a rotor disk assembly 40 having a plurality of permanent magnets 42 coupled to an inner surface (not shown) of rotor disk assembly 40. In one suitable embodiment, magnets 42 are coupled to rotor disk assembly 40 using an adhesive. Alternatively, magnets 42 are coupled to rotor disk assembly 40 by a magnet retaining ring (not shown) or any other retention method that enables electrical machine 10 to function as described herein. In the exemplary embodiment, permanent magnets 42 are symmetrically shaped, which facilitates manufacturing by enabling a single magnet design for use with each magnet 42. Furthermore, each magnet 42 has a substantially flat profile that facilitates reducing waste during manufacturing, and therefore, facilitates reducing manufacturing cost. Alternatively, permanent magnets 42 has any shape and profile that enables electrical machine 10 to function as described herein. In the exemplary embodiment, permanent magnets 42 are neodymium magnets. Alternatively, any suitable permanent magnet material may be used to fabricate permanent magnets 42 that enables electrical machine 10 to function as described herein, for example, without limitation, Samarium Cobalt and Ferrite. Rotor assembly 14 is rotatable within electrical machine 10, and more specifically, rotatable within primary and secondary bearing assemblies 16, 18 about a center axis 44.

In the exemplary embodiment, rotor disk assembly 40 is fabricated from a solid metal material, for example, without limitation, steel or iron. Alternatively, rotor disk assembly 40 is fabricated from, for example, an SMA material, an SMC material, or a powdered ferrite material, using a sintering process. The stator assembly includes a stator core (not shown) that is fabricated from a material that enables magnetic attraction between permanent magnets 42 and the stator assembly to facilitate retaining rotor disk assembly 40 and primary and secondary bearing assemblies 16, 18 in place within electrical machine 10.

In the exemplary embodiment, rotor disk assembly 40 includes a rotatable shaft 46 coupled to rotor disk assembly 40. Shaft 46 is sized to provide an interference fit with an opening (not shown) formed in rotor disk assembly 40. Alternatively, a keyway (not shown) is formed in shaft 46 for keying shaft 46 to rotor disk assembly 40. In other alternative embodiments, shaft 46 is coupled to rotor disk assembly 40 in any manner that enables electrical machine 10 to function as described herein. In the exemplary embodiment, shaft 46 extends axially away from electrical machine 10 to provide a shaft extension portion 48 for coupling to various components to be driven by electrical machine 10. Further, shaft 46 extends axially into center portion 22 of casing 20 and is rotatably coupled to primary and secondary bearing assemblies 16, 18.

Figure 3:
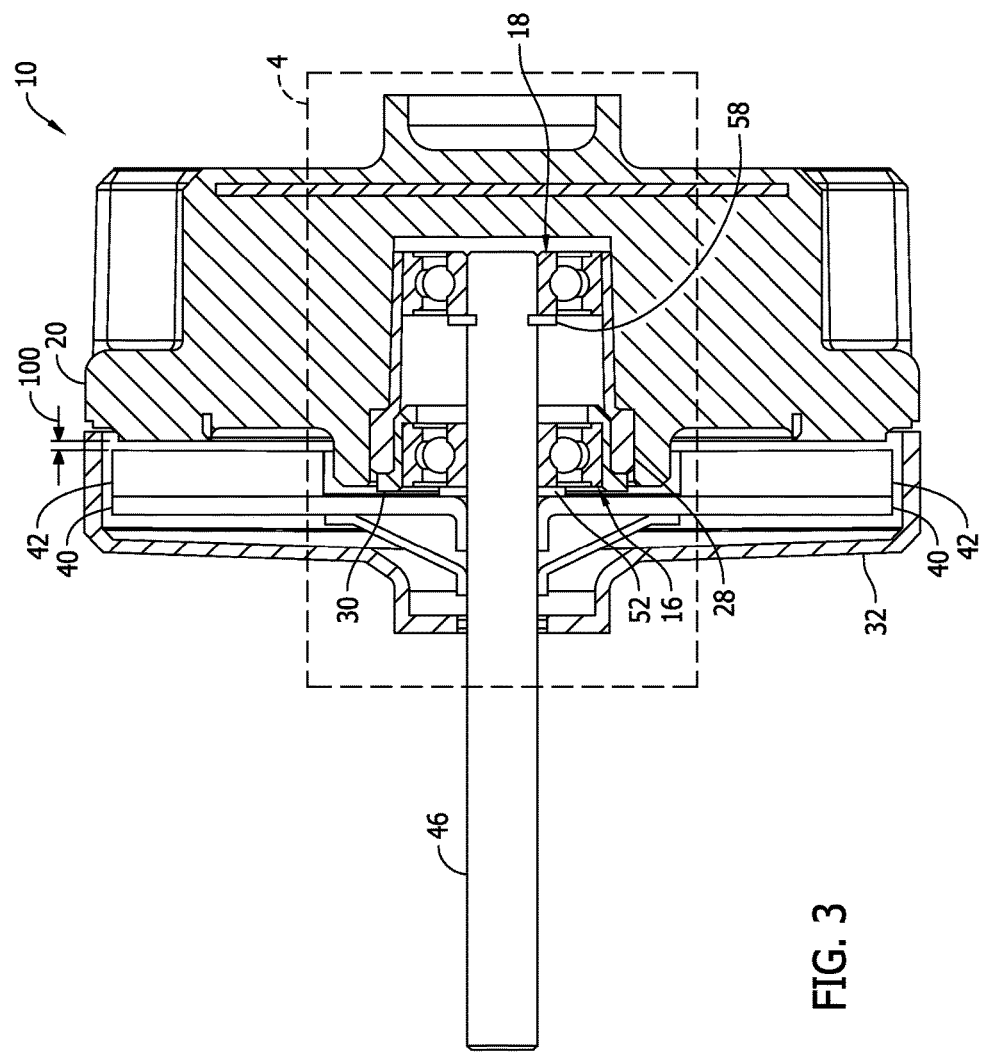
FIG. 3 is a cross-sectional view of the electrical machine taken along line 3-3 of FIG. 1.
Figure 4:
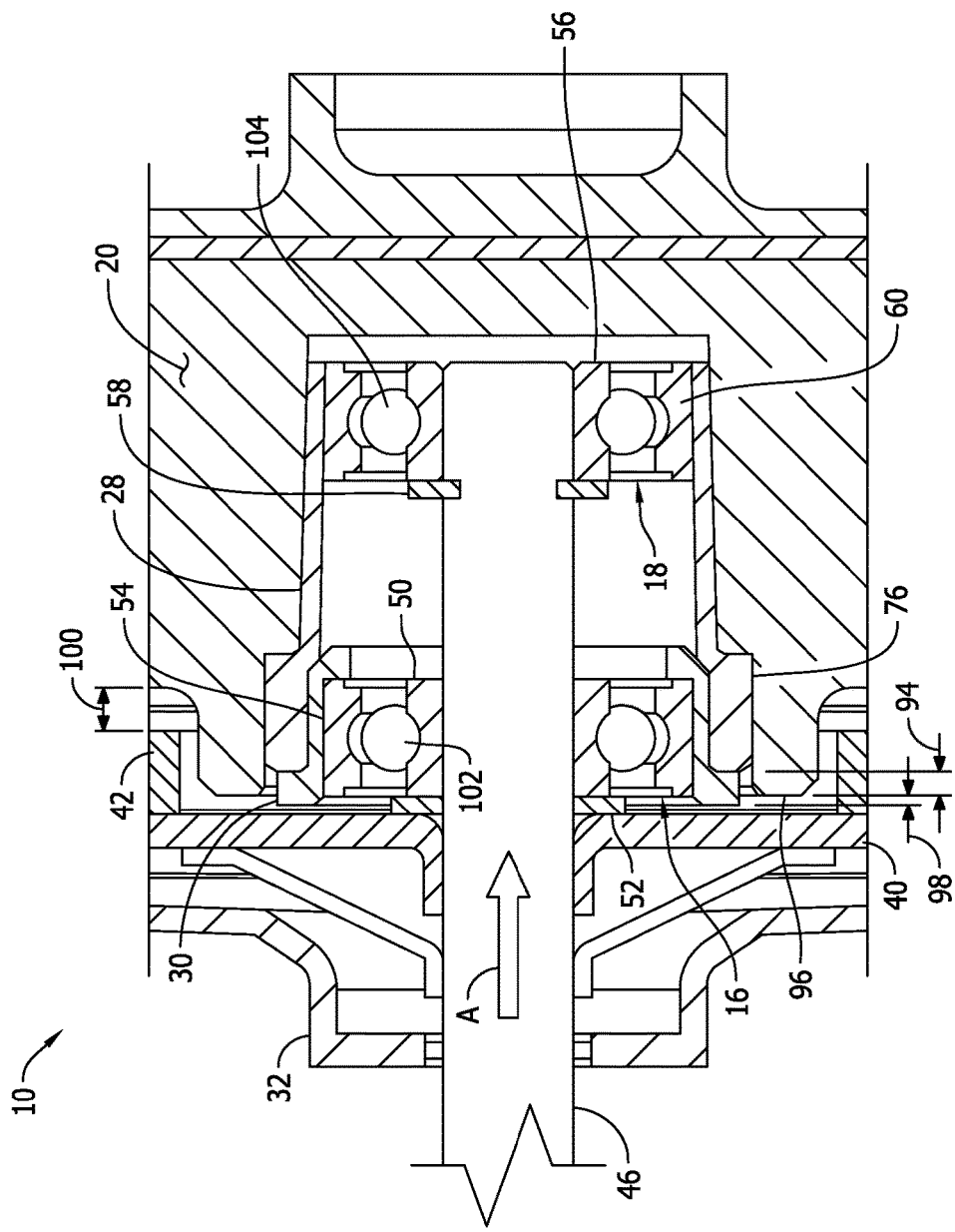
FIG. 4 is an enlarged view of a portion of FIG. 3 identified by box 4.

FIG. 3 is a cross-sectional view of electrical machine 10 taken along line 3-3 of FIG. 1. FIG. 4 is an enlarged view of a portion of FIG. 3 identified by box 4. In the exemplary embodiment, primary bearing assembly 16 is fixed to shaft 46 with an interference or tight fit. More specifically, an inner ring 50 of primary bearing assembly 16 is pressed onto shaft 46 against a spacer 52 positioned between primary bearing assembly 16 and rotor disk assembly 40. An outer ring 54 of primary bearing assembly 16 is pressed into bearing cup 30 with an interference or tight fit. Furthermore, secondary bearing assembly 18 is fixed to shaft 46 with an interference or tight fit. Specifically, an inner ring 56 of secondary bearing assembly 18 is pressed onto shaft 46 and against an E-clip 58 coupled to a groove (not shown) formed in shaft 46. An outer ring 60 of secondary bearing assembly 18 is positioned into bearing isolator 28 with a sliding fit. The sliding fit is sufficiently tight to prevent outer ring 60 from rotating within bearing isolator 28 under normal operating conditions. Thus, outer ring 60 can move in an axial direction in accordance with an axial force imposed on outer ring 60 but cannot move in a radial direction.

Figure 5:
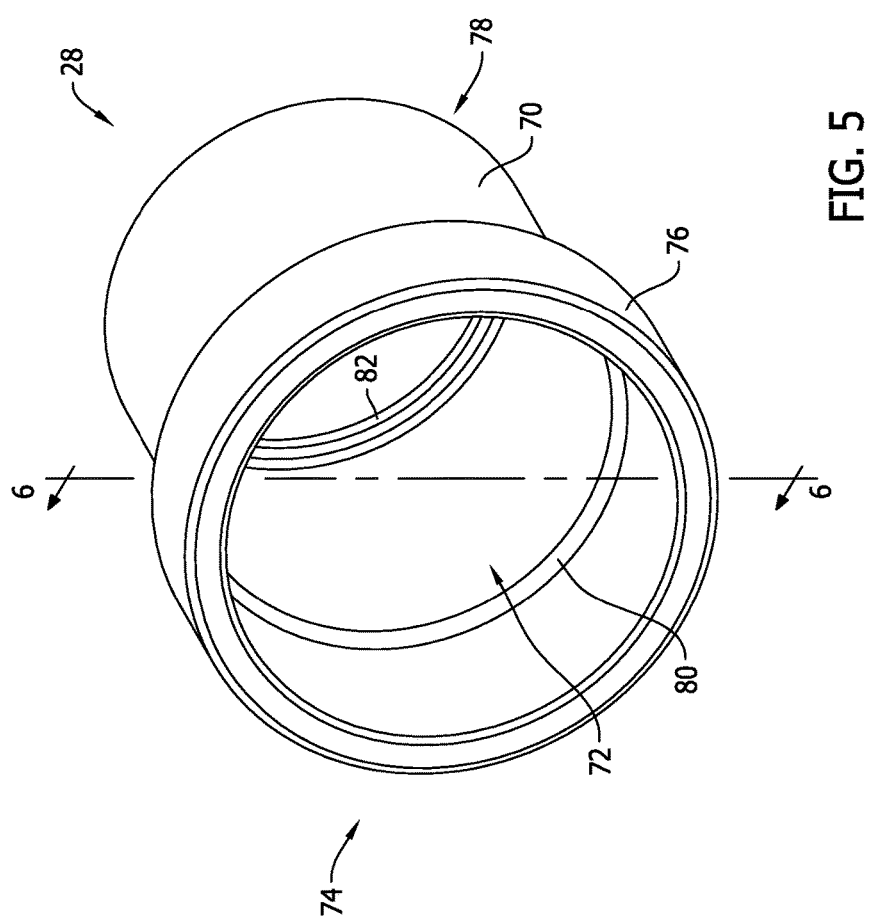
FIG. 5 is a perspective view of a bearing isolator.
Figure 6:
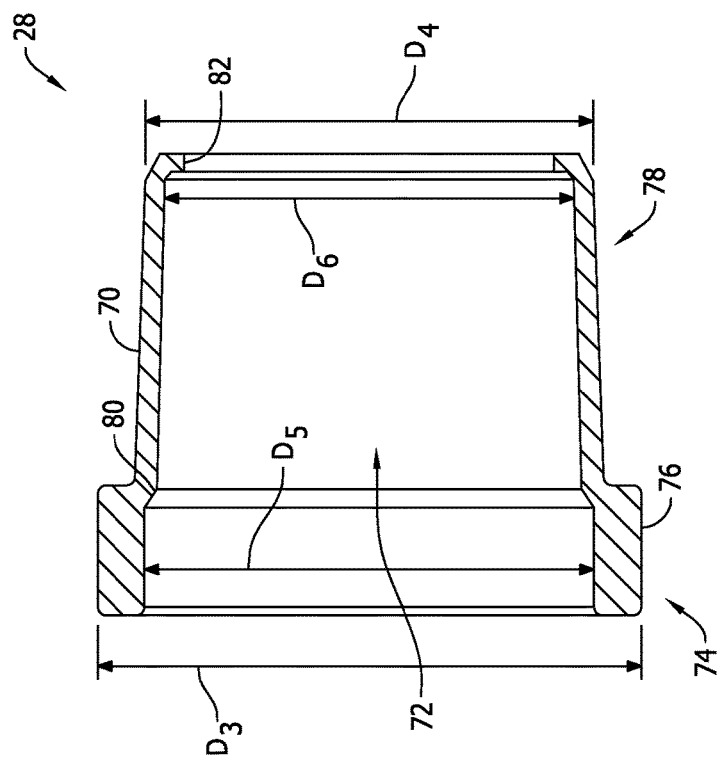
FIG. 6 is a sectional view of the bearing isolator taken about line 6-6 of FIG. 5.

FIG. 5 is a perspective view of bearing isolator 28. FIG. 6 is a sectional view of bearing isolator 28 taken about line 6-6 of FIG. 5. In the exemplary embodiment, bearing isolator 28 includes a generally cylindrical sidewall 70 defining an interior chamber 72. Sidewall 70 includes a first end portion 74 having an annular shoulder 76 having a first outer diameter D3 that is sized to slidlingly fit into first bore diameter D1 of center portion 22 (shown in FIG. 2) of casing 20. Sidewall 70 also includes a second end portion 78 having a second outer diameter D4 that is less than the first outer diameter and that is sized to slidlingly fit into second bore diameter D2 of center portion 22. Annular shoulder 76 includes a first inner diameter D5 that is sized to receive bearing cup 30, thereby forming an interference or tight fit with bearing cup 30. Moreover, sidewall 70 includes a second inner diameter D6 at second end portion 78. Second inner diameter D6 is sized to receive outer ring 60 of secondary bearing assembly 18, thereby forming a sliding fit with outer ring 60. Annular shoulder 76 defines a step 80 between first inner diameter D5 and second inner diameter D6 such that primary bearing assembly 16 is held with first end portion 74 of bearing isolator 28. At the end of second end portion 78, sidewall 70 includes a flange 82 that extends radially inward into interior chamber 72 for supporting outer ring 60 of secondary bearing assembly 18.

In the exemplary embodiment, bearing isolator 28 is fabricated from an isolation damping material, for example, without limitation, an elastomeric material, or a rubber material. In one suitable embodiment, bearing isolator 28 is fabricated from an elastomeric material having a Shore durometer in the range between about 20 A and about 90 A (type A scale). Alternatively, bearing isolator 28 is fabricated from any isolation damping or resilient material that enables bearing isolator 28 to function as described herein.

Figure 7:
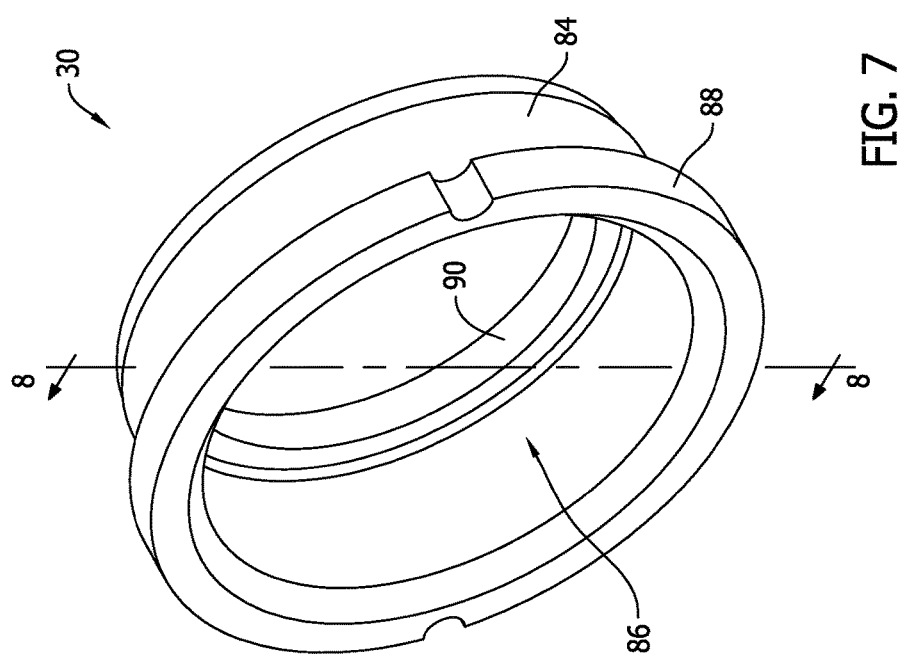
FIG. 7 is a perspective view of a bearing cup.
Figure 8:
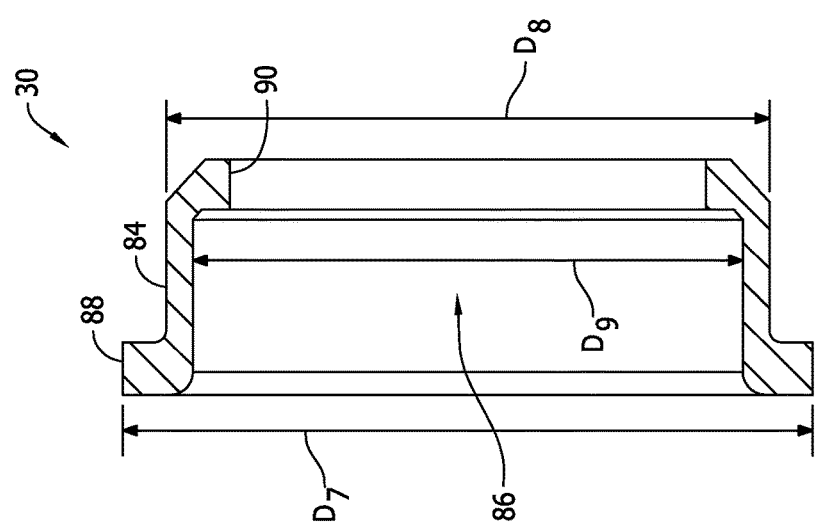
FIG. 8 is a sectional view of the bearing cup taken about line 8-8 of FIG. 7.

FIG. 7 is a perspective view of bearing cup 30. FIG. 8 is a sectional view of bearing cup 30 taken about line 8-8 of FIG. 7. In the exemplary embodiment, bearing cup 30 includes a generally cylindrical sidewall 84 defining an interior chamber 86. At a first end of sidewall 84, an annular shoulder 88 extends radially outward from interior chamber 86 and has a first outer diameter D7 that is less than first outer diameter D3 of bearing isolator 28 (shown in FIG. 6). Sidewall 84 also includes a second outer diameter D8 that is less than the first outer diameter D7 and that is sized to slidlingly fit into first inner diameter D5 of annular shoulder 76 (shown in FIG. 6). Bearing cup 30 includes an inner diameter D9 that is sized to receive outer ring 54 of primary bearing assembly 16, thereby forming an interference or tight fit with outer ring 54. At a second end of bearing cup 30, sidewall 84 includes a flange 90 that extends radially inward into interior chamber 86 for supporting outer ring 54 of primary bearing assembly 16.

In the exemplary embodiment, bearing cup 30 is fabricated from a rigid material, for example, without limitation, a plastic or metal material. In one suitable embodiment, bearing cup 30 is fabricated from an acetal resin using a machining process. Alternatively, bearing cup 30 is fabricated from any rigid material that enables bearing cup 30 to function as described herein.

An exemplary method of assembling electrical machine 10 is described herein. In the exemplary embodiment, rotor assembly 14 is assembled by coupling at least one magnet 42 to rotor disk assembly 40. Further, shaft 46 is coupled to rotor disk assembly 40 by pressing shaft 46 through an opening (not shown) formed in rotor disk assembly 40 such that shaft 46 includes portions that extend axially away from electrical machine 10 and axially into center portion 22 of casing 20. Next, bearing mount system 24 is assembled on rotor shaft 46. Specifically, spacer 52 is positioned on shaft 46 against rotor disk assembly 40 on a side towards casing 20. Primary bearing assembly 16 is then coupled to shaft 46. In particular, inner ring 50 of primary bearing assembly 16 is pressed onto shaft 46 such that it is located against spacer 52. As shown in FIG. 4, spacer 52 facilitates spacing primary bearing assembly 16 a predefined distance away from rotor disk assembly 40. Next, bearing cup 30 is coupled to primary bearing assembly 16 by pressing bearing outer ring 54 of primary bearing assembly 16 into interior chamber 86 of bearing cup 30. As described above, an interference or tight fit is formed between bearing cup 30 and outer ring 54. E-clip 58 is then coupled to a groove (not shown) formed on an end of shaft 46. Secondary bearing assembly 18 is then coupled to shaft 46. Specifically, inner ring 56 of secondary bearing assembly 18 is pressed onto shaft 46 such that it is positioned against E-clip 58.

In the exemplary embodiment, bearing isolator 28 is then coupled to secondary bearing assembly 18 and bearing cup 30. In particular, bearing isolator 28 is slid over secondary bearing assembly 18 such that outer ring 60 is positioned in interior chamber 72 and against flange 82. Flange 82 extends radially inward a predefined distance such that it is in contact with outer ring 60, but not in contact with inner ring 56. This enables the resiliency of bearing isolator 28 to provide an axial preload force to secondary bearing assembly 18, thereby facilitating reducing bearing noise and increasing bearing life. Annular shoulder 76 of bearing isolator 28 is coupled to bearing cup 30 such that annular shoulder 88 of bearing cup 30 is flush with an end of annular shoulder 76.

Next, the assembled rotor assembly 14 is rotatably coupled to casing 20. In particular, bearing mount system 24 of rotor assembly 14 is positioned in center portion 22 of casing 20. Bearing isolator 28 is inserted into center portion 22 such that second outer diameter D4 is in contact with second bore diameter D2 of center portion 22. Further, first outer diameter D3 engages first bore diameter D1 of center portion 22. As best shown in FIG. 4, annular shoulder 76 is sized to fit entirely within center portion 22, such that and end of bearing isolator 28 is axially offset a predefined distance 94 from an end surface 96 of center portion 22. In addition, annular shoulder 88 of bearing cup 30 is sized to extend axially outward beyond send surface 96 of center portion 22 a predefined distance 98. This facilitates maintaining space between rotor assembly 14 and casing 22. Furthermore, the combination of distances 94 and 96 define an air gap 100 of electrical machine 10. In the exemplary embodiment, air gap 100 is in the range between about 0.7 millimeters and about 2.2 millimeters. Alternatively, air gap 100 is any dimension that enables electrical machine 10 to function as described herein.

In the exemplary embodiment, bearing isolator 28 facilitates reducing the audible noise emitted from electrical machine 10. Generally, there are two types of noise causing vibrations in electrical machine 10: pulsating force acting in an axial direction between rotor assembly 14 and the stator assembly, and pulsating torque acting on rotor assembly 14 and the stator assembly. The pulsating force is relatively large and can cause electrical machine 10 to vibrate and emit noise. Bearing mount system 24, and in particular, bearing isolator 28, which is fabricated from an isolation damping material, facilitates reducing transmission of the pulsating force and the pulsating torque, and facilitates shifting the natural resonance of electrical machine 10 away from the pulsating force frequency. Furthermore, bearing isolator 28 is configured to apply an axial pre-load force along direction B (shown in FIG. 4) to second bearing assembly 18.

In the exemplary embodiment, as shown in FIG. 4, primary bearing assembly 16 includes outer ring 54, inner ring 50, and a plurality of first balls 102 arranged between the inner and outer rings. Similarly, secondary bearing assembly 18 includes outer ring 60, inner ring 56, and a plurality of second balls 104 arranged between the inner and outer rings. Inner rings 50 and 56 are each fixedly coupled to shaft 46. Further, outer ring 54 of primary bearing assembly 16 is fixedly coupled by press-fitting into bearing cup 30. Outer ring 60 of secondary bearing assembly 18 is slidingly coupled to bearing isolator 28 such that outer ring 60 is free to move axially with respect to casing 20. Clearances respectively exist between the outer rings of each bearing assembly and the balls, and the balls and the inner rings of each bearing assembly. Accordingly, shaft 46 is axially displaceable by an amount equal to a sum of these clearances.

In the assembled state of electrical machine 10, outer ring 54 of primary bearing assembly 16 is held in place within center portion 22 of casing 20 by bearing cup 30. Inner ring 50 of primary bearing assembly 16 is pre-pressurized in an axial direction A (shown in FIG. 4) by a magnetic attraction force between rotor assembly 14 and the stator assembly. In the exemplary embodiment, the magnetic attraction force is in the range between about 3 kilograms and about 10 kilograms. The magnetic attraction force acts on inner ring 50 via spacer 52, thus shaft 46 is biased along direction A to its maximum by the summed amount of the above described clearances.

Secondary bearing assembly 18 is coupled to shaft 46 and held in place by E-ring 58. E-ring 58 is positioned adjacent inner ring 56, and flange 82 is positioned on the opposite side of secondary bearing assembly 18 adjacent outer ring 60. Bearing isolator 28 is configured to apply an axial pre-load force along direction B such that outer ring 60 is biased along direction B to its maximum by the summed amount of the above described clearances. Therefore, each respective outer ring of bearing assemblies 16 and 18 is biased axially away from each respective inner ring to remove the above described clearances to facilitate reducing vibration and noise.

Figure 9:
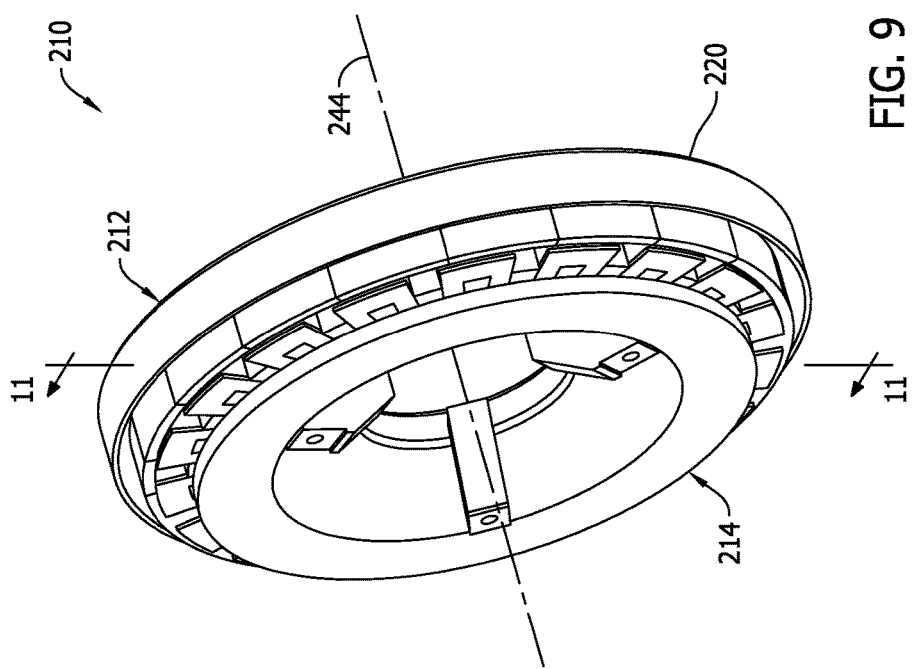
FIG. 9 is a schematic perspective of an alternative electrical machine.
Figure 10:
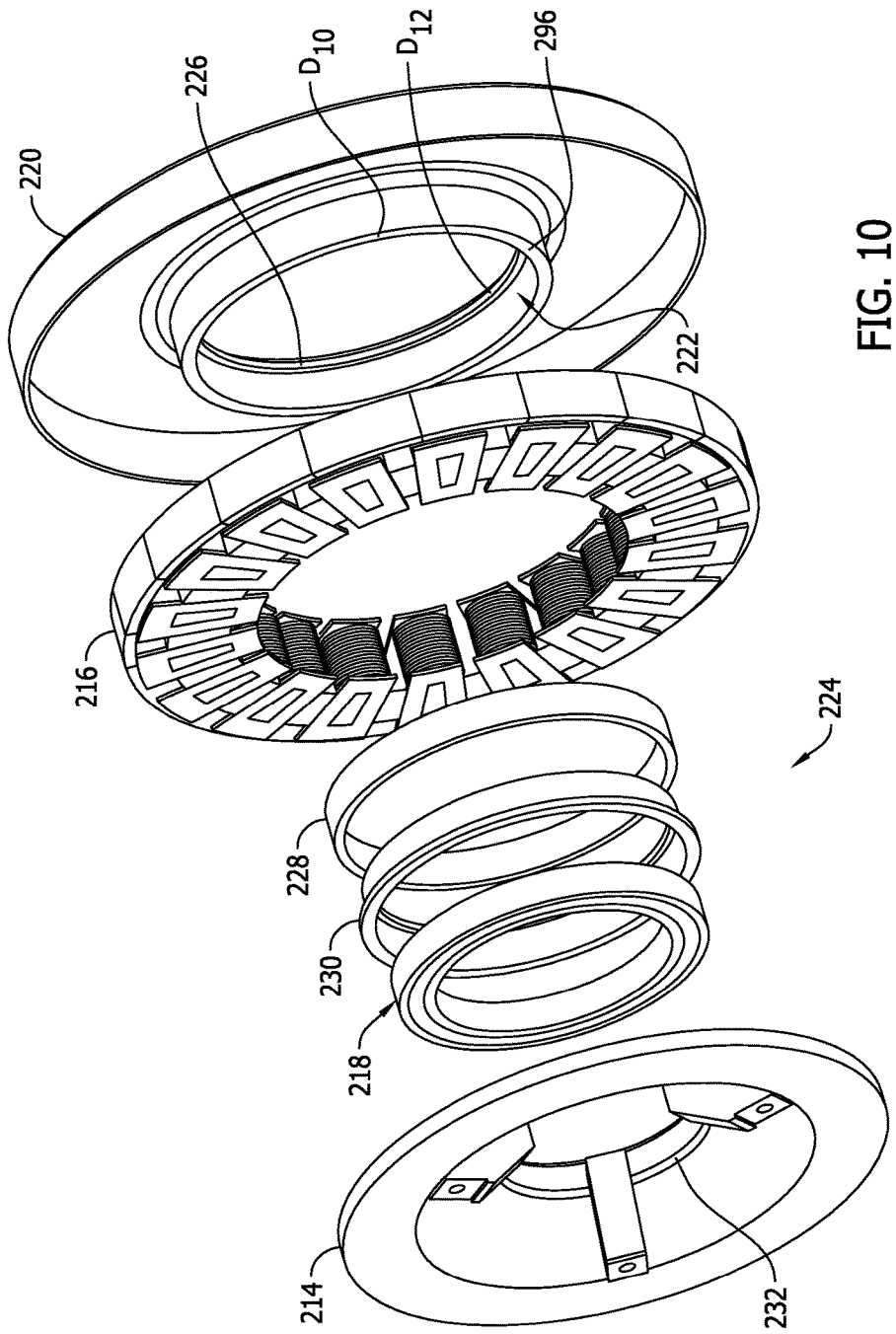
FIG. 10 is an exploded view of the alternative electrical machine.

FIG. 9 is a schematic perspective of an alternative electrical machine 210. FIG. 10 is an exploded view of electrical machine 210. In this embodiment, electrical machine 210 includes a housing 212, a rotor assembly 214, a stator assembly 216 coupled to housing 212, and a bearing assembly 218 coupled between rotor assembly 214 and housing 212.

Housing 212 is configured to provide a protective covering stator assembly 216. Housing 212 includes a casing 220 configured to enclose at least a portion of stator assembly 216. Casing 220 is suitably fabricated from any number of materials, including a plastic or metal material. Alternatively, casing 220 is fabricated from a combination of materials, for example, buy attaching a flexible or compliant material to a rigid material. In some alternative embodiments, casing 220 is fabricated from any suitable material, such as metal, that enables casing 220 to function as described herein.

Casing 220 includes a center portion 222 that is configured to receive a bearing mount system 224. Center portion 222 is formed as a substantially cylindrical stepped bore in casing 220 and includes a first bore diameter D10 and a lip 226 that defines a smaller second bore diameter D12 of center portion 22. In the exemplary embodiment, center portion 222 receives a bearing isolator 228 that is seated in center portion 222 against lip 226. Bearing isolator 228 receives a bearing cup 230, which in turn receives bearing assembly 218 therein. Bearing isolator 228 engages and locates bearing cup 230. Bearing cup 230 engages and locates bearing assembly 218 by engaging an outer race portion of the bearing assembly 218 to position and secure bearing assembly 218 radially inward from and concentric with stator assembly 216. Housing 212 is further configured to maintain an axially stationary position of stator assembly 216 and bearing assembly 218 during rotation rotor assembly 214.

Rotor assembly 214 includes a plurality of permanent magnets (not shown) coupled to an inner surface (not shown) of rotor assembly 214. Rotor assembly includes an axially-extending bearing mount flange 232 for coupling to bearing assembly 218. A lip 234 (not shown in FIGS. 9 and 10) is formed on mount flange 232 for seating against an inner ring portion of bearing assembly 218. Rotor assembly 214 is rotatable within electrical machine 210, and more specifically, rotatable within bearing assembly 218 about a center axis 244.

Rotor assembly 214 is fabricated from a solid metal material, for example, without limitation, steel or iron. Alternatively, rotor assembly 214 is fabricated from, for example, an SMA material, an SMC material, or a powdered ferrite material, using a sintering process. Stator assembly 216 includes a stator core (not shown) that is fabricated from a material that enables magnetic attraction between the permanent magnets of rotor assembly 214 and stator assembly 216 to facilitate retaining rotor assembly 214 and bearing assembly 218 in place within electrical machine 210.

Figure 11:
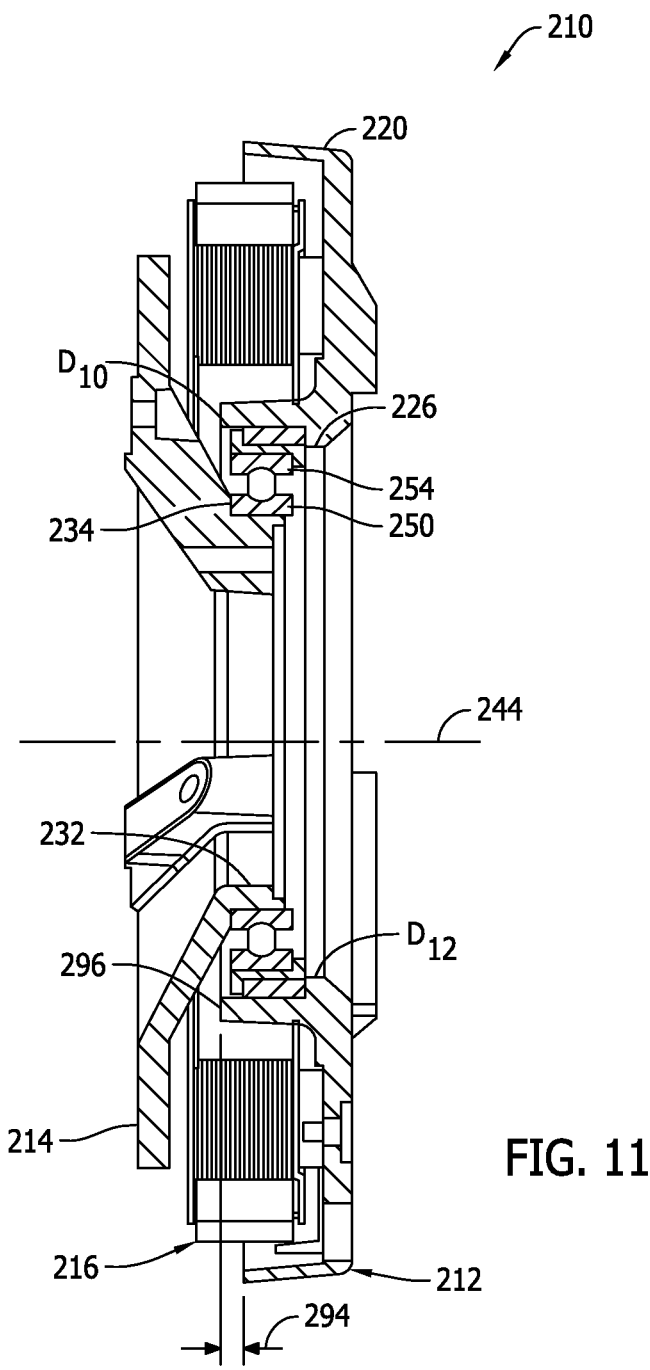
FIG. 11 is a cross-sectional view of the alternative electrical machine taken along line 11-11 of FIG. 9.

FIG. 11 is a cross-sectional view of electrical machine 210 taken along line 11-11 of FIG. 9. Bearing assembly 218 is fixed to rotor assembly 214 with an interference or tight fit. More specifically, an inner ring 250 of bearing assembly 218 is pressed onto bearing mount flange 232 and seated against lip 234. An outer ring 254 of bearing assembly 218 is pressed into bearing cup 230 with an interference or tight fit.

Figure 12:
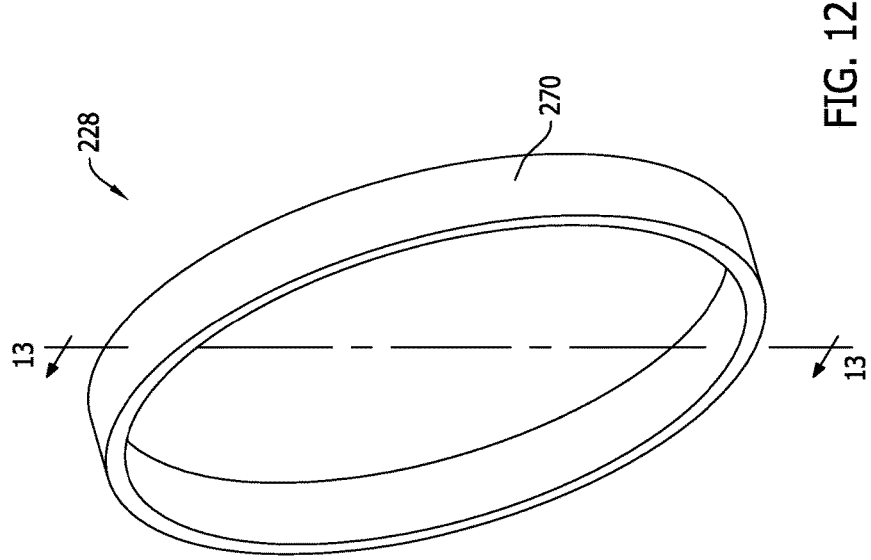
FIG. 12 is a perspective view of an alternative bearing isolator.
Figure 13:
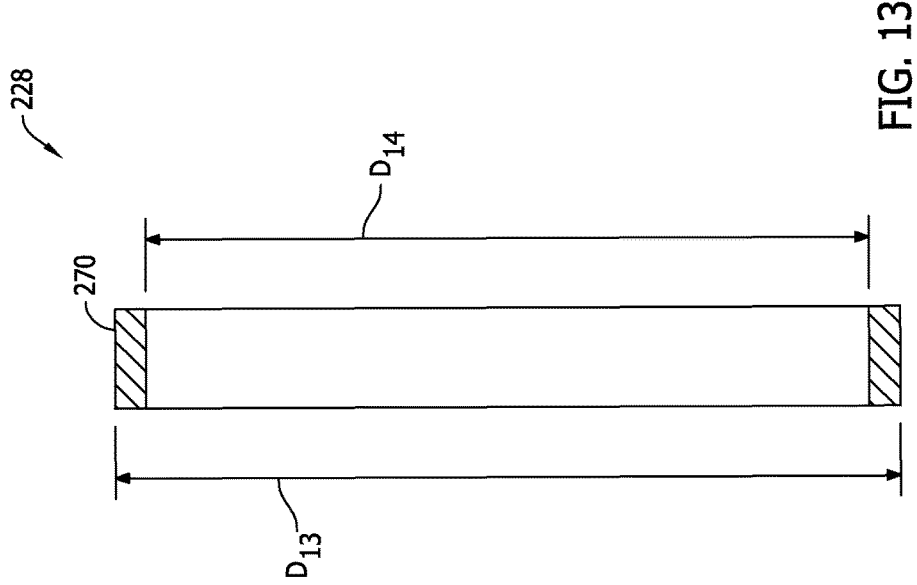
FIG. 13 is a sectional view of the alternative bearing isolator taken about line 13-13 of FIG. 12.

FIG. 12 is a perspective view of bearing isolator 228. FIG. 13 is a sectional view of bearing isolator 228 taken about line 13-13 of FIG. 12. In the exemplary embodiment, bearing isolator 228 includes a generally cylindrical sidewall 270. Bearing isolator 228 is substantially ring-shaped and has a generally rectangular cross-section. Sidewall 270 has an outer diameter D13 that is sized to slidingly fit into first bore diameter D10 of center portion 222 (shown in FIG. 11) of casing 220. Sidewall 270 also includes an inner diameter D14 that is sized to receive bearing cup 230, thereby forming an interference or tight fit with bearing cup 230. Bearing isolator 228 is fabricated from an isolation damping material, for example, without limitation, an elastomeric material, or a rubber material. In one suitable embodiment, bearing isolator 228 is fabricated from an elastomeric material having a Shore durometer in the range between about 20 A and about 90 A (type A scale). Alternatively, bearing isolator 228 is fabricated from any isolation damping or resilient material that enables bearing isolator 228 to function as described herein.

Figure 14:
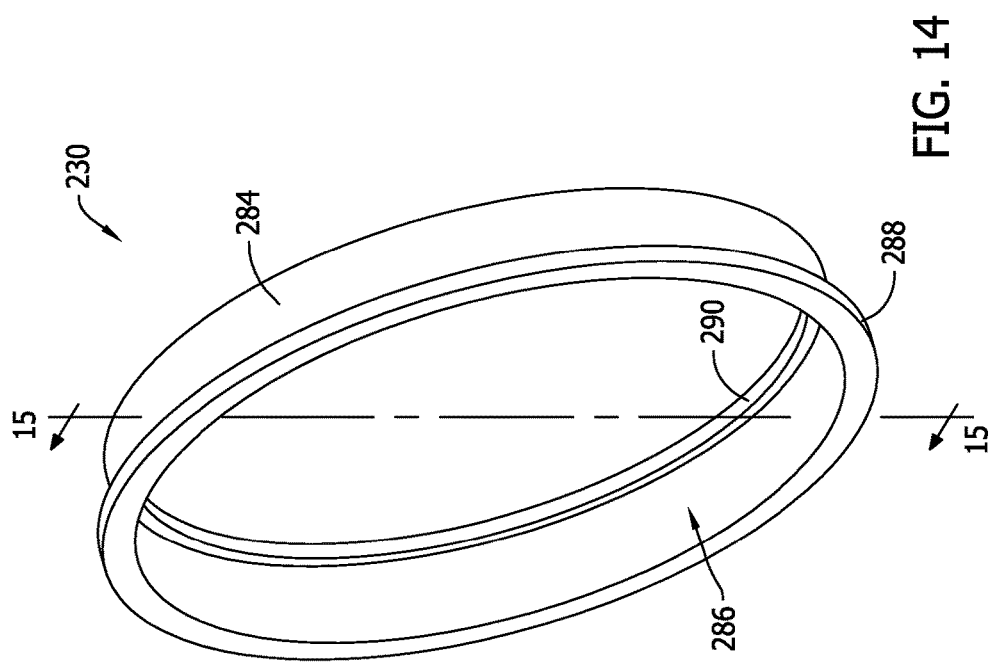
FIG. 14 is a perspective view of an alternative bearing cup.

FIG. 14 is a perspective view of bearing cup 230. FIG. 15 is a sectional view of bearing cup 230 taken about line 15-15 of FIG. 14. Bearing cup 230 includes a generally cylindrical sidewall 284 defining an interior chamber 286. At a first end of sidewall 284, an annular shoulder 288 extends radially outward from interior chamber 286 and has a first outer diameter D15 that is less than first outer diameter D13 of bearing isolator 228 (shown in FIG. 11). Sidewall 284 also includes a second outer diameter D16 that is less than the first outer diameter D15 and that is sized to slidingly fit into inner diameter D14 of bearing isolator 228 (shown in FIG. 11). Bearing cup 230 includes an inner diameter D17 that is sized to receive outer ring 254 of bearing assembly 218, thereby forming an interference or tight fit with outer ring 254. At a second end of bearing cup 230, sidewall 284 includes a flange 290 that extends radially inward into interior chamber 286 for supporting outer ring 254 of bearing assembly 218.

In the exemplary embodiment, bearing cup 230 is fabricated from a rigid material, for example, without limitation, a plastic or metal material. In one suitable embodiment, bearing cup 230 is fabricated from an acetal resin using a machining process. Alternatively, bearing cup 230 is fabricated from any rigid material that enables bearing cup 230 to function as described herein.

An exemplary method of assembling electrical machine 210 is described herein. In the exemplary embodiment, bearing mount system 224 is assembled on rotor assembly 214. Specifically, inner ring 250 of bearing assembly 218 is pressed onto bearing mount flange 232 such that it is located flush against lip 234. As shown in FIG. 11, bearing assembly 218 facilitates spacing rotor assembly 214 a predefined distance away from stator assembly 216. Next, bearing cup 230 is coupled to bearing assembly 218 by pressing bearing outer ring 254 into interior chamber 286 of bearing cup 230. As described above, an interference or tight fit is formed between bearing cup 230 and outer ring 254. Bearing isolator 228 is coupled to bearing cup 230 such that annular shoulder 288 of bearing cup 230 is flush with an end of bearing isolator 228.

Next, the assembled rotor assembly 214 is rotatably coupled to casing 220. In particular, bearing mount system 224 of rotor assembly 214 is positioned in center portion 222 of casing 220. Bearing isolator 228 is inserted into center portion 222 such that outer diameter D15 engages first bore diameter D10 of center portion 222. As best shown in FIG. 11, bearing isolator 228 is sized to fit entirely within center portion 222, such that and end of bearing isolator 228 is axially offset a predefined distance 294 from an end surface 296 of center portion 222. In addition, annular shoulder 288 of bearing cup 230 is sized to fit inward of end surface 296 as well. Bearing mount system 224 facilitates maintaining space between rotor assembly 214 and stator assembly 216.

The present disclosure provides bearing mount system with improved damping characteristics that facilitates reducing the audible noise emitted from the electrical machine. More specifically, the bearing mount system includes a resilient bearing isolator that maintains the bearing assemblies in a position needed for the electrical machine to function while reducing vibrations generated by pulsating forces and torques within the electrical machine. In addition, the bearing mount system facilitates moving the natural resonance of the electrical machine away from the frequency of the pulsating forces. Furthermore, the bearing mount system provided applies an axial pre-load force to the second bearing assembly, thereby eliminating the need to use an additional biasing means. This facilitates reducing the static magnetic force on the bearing assemblies. Moreover, the disclosure provides a bearing mount system fabricated from a resilient material that enables reduced manufacturing tolerances, thereby decreasing costs, and that facilitates insulating the bearing assemblies from a metal bore in the electrical machine housing to improve bearing current issues.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An axial flux electrical machine comprising: a housing comprising a center portion comprising a cylindrical wall; a stator assembly coupled to said housing; at least one bearing assembly coupled to said stator assembly; a rotor assembly rotatably coupled to said at least one bearing assembly; and a bearing mount system comprising: a bearing isolator coupled to said cylindrical wall of said housing, and a bearing cup coupled to said at least one bearing assembly and said bearing isolator, wherein said bearing isolator receives said bearing cup therein to locate and support said bearing cup within said housing;
wherein said at least one bearing assembly comprises a first bearing assembly and a second bearing assembly, said second bearing assembly comprising an inner ring and an outer ring;
wherein said first bearing assembly is coupled to said bearing cup, and said second bearing assembly is coupled to said bearing isolator.

2. The axial flux electrical machine in accordance with claim 1, wherein said bearing isolator is substantially ring-shaped and comprises a generally rectangular cross-section.

3. The axial flux electrical machine in accordance with claim 1, wherein said bearing isolator is fabricated from an isolation damping material.

4. The axial flux electrical machine in accordance with claim 3, wherein said isolation damping material comprises an elastomeric material having a Shore durometer in the range between about 20 A and about 90 A.

5. The axial flux electrical machine in accordance with claim 1, wherein said rotor assembly comprises a rotatable shaft fixedly coupled to said second bearing assembly, and wherein said bearing isolator comprises a flange that engages said outer ring of said second bearing assembly, said bearing isolator configured to apply an axial pre-load force to said second bearing assembly to urge said second bearing assembly toward said first bearing assembly.

6. The axial flux electrical machine in accordance with claim 5, wherein said inner ring of said second bearing assembly forms an interference fit with said rotatable shaft, and wherein said outer ring of said second bearing assembly forms a sliding fit with said bearing isolator.

7. The axial flux electrical machine in accordance with claim 1, wherein said at least one bearing assembly comprises an outer ring, wherein said bearing cup is configured to receive said at least one bearing assembly therein and engage said outer ring of said at least one bearing assembly.

8. The axial flux electrical machine in accordance with claim 1, wherein said bearing isolator defines an interior chamber having a first inner diameter and a second inner diameter, wherein the first inner diameter is greater than the second inner diameter.

9. A bearing mount system for an axial flux electrical machine, the axial flux electrical machine including a housing including a wall having an inner surface, and a rotor assembly rotatably coupled to the housing using a bearing assembly, said bearing mount system comprising: a bearing isolator coupled to the inner surface of the wall of the housing, said bearing isolator comprising an inner surface having an inner diameter; and a bearing cup comprising a radially-inward-extending flange located at a first end of said bearing cup, said bearing cup coupled to an outer ring of the bearing assembly, said bearing cup further coupled to said inner surface of said bearing isolator, wherein said bearing isolator receives said bearing cup therein to locate and support said bearing cup within said housing;

wherein said bearing isolator comprises a generally cylindrical sidewall defining an interior chamber, said sidewall comprising an annular shoulder located at a first end of said sidewall, said annular shoulder comprising a first inner surface defining a first inner diameter and a first outer surface defining a first outer diameter, wherein the first outer diameter of said first outer surface is dimensioned to slidingly couple to the inner surface of the wall of the housing;

wherein said sidewall further comprises a second inner surface defining a second inner diameter and a second outer surface defining a second outer diameter located at a second end of said sidewall, wherein the second outer diameter is less than the first outer diameter, and wherein said second outer surface is dimensioned to slidingly couple to the inner surface of the wall of the housing.

10. The bearing mount system in accordance with claim 9, wherein said bearing isolator is substantially ring-shaped and comprises a generally rectangular cross-section.

11. The bearing mount system in accordance with claim 9, wherein said bearing isolator is fabricated from an isolation damping material.

12. The bearing mount system in accordance with claim 11, wherein said isolation damping material comprises an elastomeric material having a Shore durometer in the range between about 20 A and about 90 A.

13. The bearing mount system in accordance with claim 9, wherein said bearing isolator further comprises a flange located at said second end, said flange extending radially inward into said bearing isolator interior chamber.

14. The bearing mount system in accordance with claim 9, wherein said bearing cup comprises a generally cylindrical sidewall comprising an outer surface defining an outer diameter, said sidewall defining an interior chamber, said sidewall comprising an annular shoulder that extends radially outward from said interior chamber at a second end of said sidewall.

15. A method of assembling an axial flux electrical, said method comprising: providing a rotor assembly and a housing including a cylindrical wall; coupling at least one bearing assembly to the rotor assembly, wherein an inner ring of the at least one bearing assembly forms an interference fit with the rotor assembly; coupling a bearing cup to the at least one bearing assembly, wherein an outer ring of the at least one bearing assembly forms an interference fit with the bearing cup; coupling a bearing isolator to the bearing cup; and coupling the rotor assembly to the housing, wherein the bearing isolator engages the wall of the housing, wherein said bearing isolator receives said bearing cup therein to locate and support said bearing cup within said housing;

wherein the at least one bearing includes a first bearing assembly and a second bearing assembly, wherein coupling a bearing isolator to the bearing cup comprises coupling the bearing isolator to the second bearing assembly and the bearing cup, the bearing isolator including a flange configured to engage an outer ring of the second bearing assembly to provide an axial preload force to the second bearing assembly.

16. The method in accordance with claim 15 further comprising coupling a rotatable shaft to the rotor assembly, wherein an inner ring of the first bearing assembly forms an interference fit with the rotatable shaft.

17. The method in accordance with claim 16 further comprising coupling the second bearing assembly to the rotatable shaft, wherein an inner ring of the second bearing assembly forms an interference fit with the rotatable shaft.

* * * * *